(12) United States Patent
Hirano et al.

(10) Patent No.: US 9,644,950 B2
(45) Date of Patent: May 9, 2017

(54) SHAPE MEASURING APPARATUS AND POINT SENSOR POSITIONING UNIT

(71) Applicant: Mitutoyo Corporation, Kawasaki-shi, Kanagawa (JP)

(72) Inventors: Kotaro Hirano, Hiroshima (JP); Naoki Izumi, Hiroshima (JP); Hideki Shindo, Hiroshima (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 14/871,564

(22) Filed: Sep. 30, 2015

(65) Prior Publication Data
US 2016/0097635 A1 Apr. 7, 2016

(30) Foreign Application Priority Data

Oct. 2, 2014 (JP) .................................. 2014-203887
Oct. 2, 2014 (JP) .................................. 2014-203957

(51) Int. Cl.
*G01B 11/24* (2006.01)
*G01B 21/04* (2006.01)

(52) U.S. Cl.
CPC ............ *G01B 11/24* (2013.01); *G01B 21/047* (2013.01); *G01B 2210/50* (2013.01)

(58) Field of Classification Search
CPC .. G01B 2210/50; G01B 11/026; G01B 11/14; G01B 11/24; G01B 9/04; G01B 5/28; G02B 21/00
USPC ............................................. 356/601–623
See application file for complete search history.

(56) References Cited

U.S. PATENT DOCUMENTS

| | | | | |
|---|---|---|---|---|
| 6,618,496 | B1 * | 9/2003 | Tassakos | B25J 19/021 382/152 |
| 7,423,734 | B1 * | 9/2008 | Luik | B23B 31/00 356/141.1 |
| 7,483,150 | B2 | 1/2009 | Lehmann | |
| 7,626,705 | B2 | 12/2009 | Altendorf | |
| 9,261,351 | B1 * | 2/2016 | Patzwald | G01B 11/026 |
| 2001/0024280 | A1 * | 9/2001 | Fukuda | G01B 11/245 356/609 |
| 2004/0057057 | A1 * | 3/2004 | Isaacs | G01B 11/24 356/601 |
| 2007/0253048 | A1 * | 11/2007 | Sakai | G02B 26/124 359/204.5 |

(Continued)

FOREIGN PATENT DOCUMENTS

| | | |
|---|---|---|
| JP | 2008-256679 | 10/2008 |
| JP | 4929161 | 5/2012 |

OTHER PUBLICATIONS

Website Publishing the Applicant's Products Catalogue: http://www.mitutoyo.co.jp/support/service/catalog/11_gazo/14007.pdf 40 pages; Discussed in Specification.

*Primary Examiner* — Hoa Pham
(74) *Attorney, Agent, or Firm* — Rankin, Hill & Clark LLP

(57) ABSTRACT

A positioning unit includes two or more the laser light sources disposed around a point sensor. Laser light beams from the two or more the laser light sources intersect at an adjustment point separated from a detection point, which is away from the point sensor, by a predetermined distance. The adjustment point is positioned on a desired measurement start point on a work, the point sensor is moved close to the work by the predetermined distance, and a measurement scan of the work is started.

8 Claims, 12 Drawing Sheets

(56) References Cited

U.S. PATENT DOCUMENTS

| | | | |
|---|---|---|---|
| 2013/0222815 A1* | 8/2013 | Patzwald | G01B 11/026 356/612 |
| 2013/0314689 A1* | 11/2013 | Jones | G01B 21/047 356/4.01 |
| 2016/0103443 A1* | 4/2016 | Bryll | G05B 19/21 700/114 |

* cited by examiner

Fig. 7

| ONE LASER LIGHT BEAM | THE OTHER LASER LIGHT BEAM | INTERSECTION POINT (SHAPE OF ADJUSTMENT POINT) | BAD EXAMPLES |
|---|---|---|---|
| ⬭ | ✕ | ⊗ (ellipse with X) | ⊘ (ellipse with X) |
| ⬭ | ○ | ⊙ (ellipse with small ellipse inside) | ⊙ (ellipse with small ellipse inside, offset) |
| ○ | + | ⊕ | ⊕ |
| + | ✕ | ✶ | ✶ |

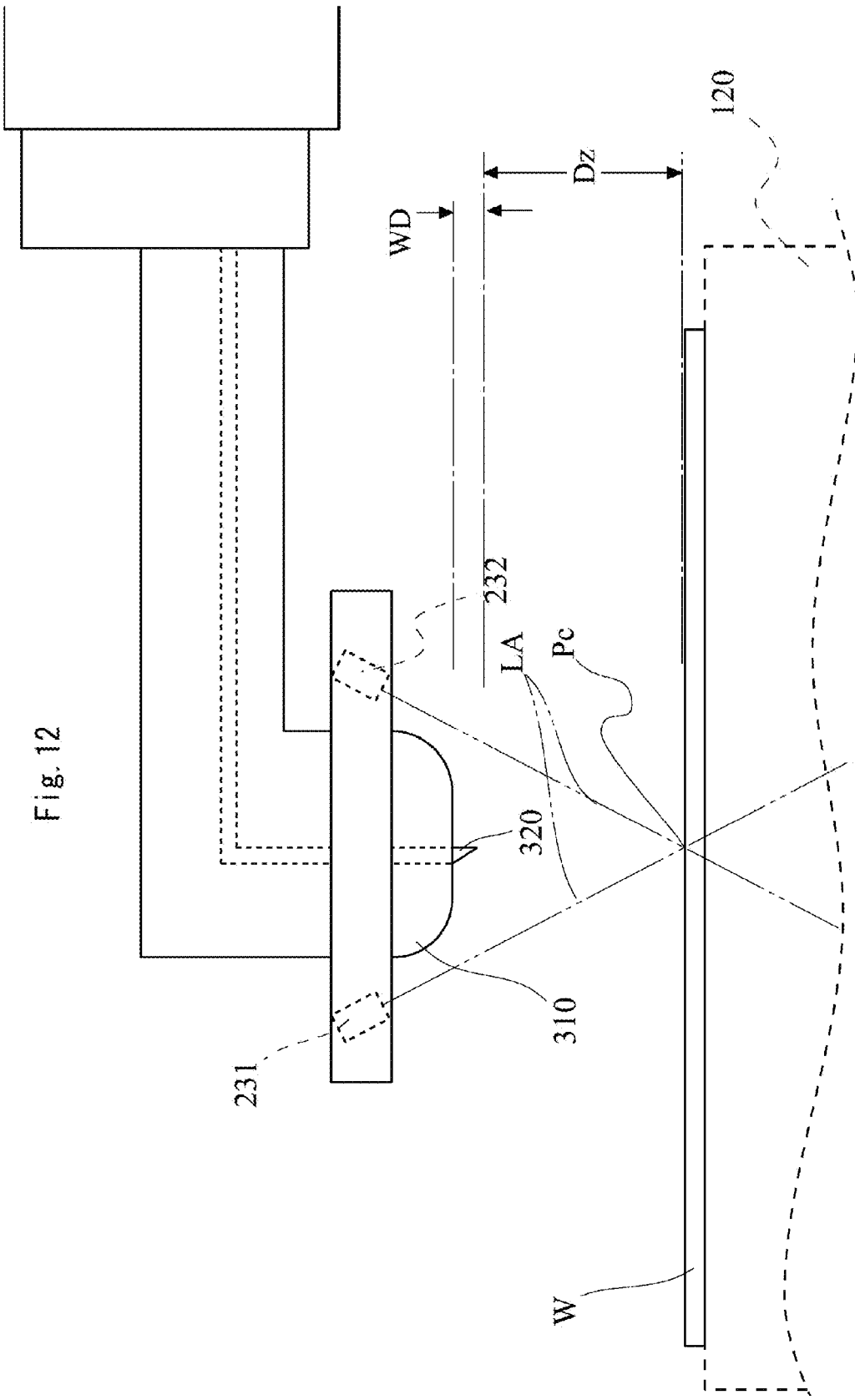

SHAPE MEASURING APPARATUS AND POINT SENSOR POSITIONING UNIT

INCORPORATION BY REFERENCE

This application is based upon and claims the benefit of priority from Japanese patent application No. 2014-203887 and Japanese patent application No. 2014-203957, filed on Oct. 2, 2014, the disclosure of which are incorporated herein in its entirety by reference.

BACKGROUND OF THE INVENTION

1. Field of the Invention

The present invention relates to a shape measuring apparatus. For example, the present invention relates to a shape measuring apparatus which measures a shape, surface roughness, roundness, and the like of a measured object by scanning a measured object surface with or without contact. More specifically, the present invention relates to a technique which can position a detection point of the shape measuring apparatus on a user's intended measurement start point.

2. Description of Related Art

As a sensor for detecting a workpiece, there are, for example, a contact probe or stylus. Alternatively, there is known an optical or capacitance noncontact sensor and the like (JP 4929161 B and JP 2008-256679 A). In the present specification, these sensors are referred to as point sensors. These point sensors approach a measured object surface along with the normal direction of the measured object surface and detect the position (coordinates) of the measured object surface on the normal line. (It is possible to approach the surface from an oblique direction. The point sensor may approach the surface in a case that an appropriate correction function is provided.) The point sensors scan the measured object surface, and thereby a shape, surface roughness, waviness, and the like of the measured object surface on the scanning line are detected in detail. By scanning the measured object surface with the sensor, a shape measuring apparatus, which measures a shape, surface roughness, roundness, and the like of a measured object, is used.

In order to measure an object (work) with the shape measuring apparatus, first, a detection point of a point sensor needs to be set to a measurement start point. In other words, after deciding which part of the work is to be measured, the detection point of the point sensor is required to be positioned on the desired part to be measured.

As a method for positioning the detection point on the measurement start point, for example, the following method has been provided (a website publishing the applicant's products catalogue: http://www.mitutoyo.co.jp/support/service/catalog/11_gazo/14007.pdf). It is assumed that the shape measuring apparatus is equipped with an image sensor in addition to a point sensor. First, the image of the entire work is measured with the image sensor. Thus, the work image is preliminarily obtained. A range to be measured in detail in the work image is determined, and a measurement start point and a measurement end point are specified using coordinates in the work image. Then, the shape measuring apparatus moves the point sensor on the specified coordinates and starts measurement. Thus, the measurement as the user intended is performed, and the user can obtain the desired measurement result.

SUMMARY OF THE INVENTION

However, a shape measuring apparatus equipped with an image sensor is naturally expensive. An ordinary shape measuring apparatus is normally equipped with only a point sensor, and it is impossible to specify the measurement start point with coordinates in the work image preliminarily obtained. Therefore, the user has no choice but to manually position the point sensor on the measurement start point relying on visual observation and sensation on the user's hand, which is not so easy.

As an example, a chromatic point sensor (CPS) is considered (JP 4929161 B and JP 2008-256679 A). (The CPS is also referred to as a confocal microscope.) The working distance of the CPS is extremely short, for example, is about 5 to 20 mm. In contrast, the diameter of a lens barrel is about 50 mm. Therefore, a detection point of the CPS cannot be seen from outside of the lens barrel. Furthermore, the spot diameter of the light emitted from the CPS toward the work is about 2 to 4 μm and is too small to be visually observed with the naked eyes.

This problem applies to a contact point sensor.

For example, a skid type contact point sensor has been wide spread.

In the skid type contact point sensor, a stylus is disposed inside a skid having a through hole, and the tip of the stylus slightly protrudes from the skid (for example, about 0.5 mm). When the sensor is used, the position where the work is in contact with the tip of the stylus cannot be seen directly, and the user ultimately relies on experiences and intuition to judge whether or not the tip of the stylus is in contact with the intended measurement start point.

If trying to approach the point several times, the user may position the tip of the stylus on the intended point. However, it takes some time.

A purpose of the present invention is to easily and quickly position the detection point of the point sensor on the measurement start point.

In an aspect of the present invention, a shape measuring apparatus includes:

a point sensor configured to approach a measured object surface and detect a measured object;

a moving mechanism configured to three-dimensionally relatively move the measured object and the point sensor; and a positioning unit configured to position a detection point of the point sensor on a desired measurement start point, in which the positioning unit includes two or more laser light sources, and laser light beams from the two or more laser light sources intersect at an adjustment point separated from the detection point, which is away from the point sensor, by a predetermined distance.

In an aspect of the present invention, it is preferable that:

the adjustment point is separated from the detection point by a predetermined distance Dz along with a measurement axis of the point sensor.

In an aspect of the present invention, it is preferable that:

the predetermined distance Dz is 20 to 100 times a working distance of the point sensor.

In an aspect of the present invention, it is preferable that:

the shape measuring apparatus has no image sensor for measuring an image.

In an aspect of the present invention, it is preferable that:

a flange protruding in a direction orthogonal to a measurement axis is attached along the point sensor, and the two or more laser light sources are disposed in the flange.

In an aspect of the present invention, it is preferable that:

the point sensor is a chromatic point sensor.

In an aspect of the present invention, it is preferable that: the laser light beams from the two or more laser light sources have a different color or a different pattern from each other.

In an aspect of the present invention, a shape measurement method using the shape measuring apparatus, the method includes:

positioning the adjustment point on a desired measurement start point on a work;

moving the point sensor close to the work by the predetermined distance; and starting a measurement scan of the work.

In an aspect of the present invention, a positioning unit of a point sensor to position a detection point of the point sensor, which approaches a measured object surface and detects a measured object, on a desired measurement start point, the positioning unit includes:

two or more laser light source disposed around the point sensor, in which laser light beams from the two or more laser light sources intersect at an adjustment point separated from the detection point, which is away from the point sensor, by a predetermined distance.

In an aspect of the present invention, a positioning offset calculation method of the shape measuring apparatus, the method includes:

preparing a photoelectric sensor as a work to calculate an offset;

positioning the adjustment point on the photoelectric sensor;

obtaining coordinates of the moving mechanism (X2, Y2, Z2) and coordinates of a light receiving point on the photoelectric sensor (x2, y2, 0) at this time;

positioning the detection point on the photoelectric sensor;

obtaining coordinates of the moving mechanism (X1, Y1, Z1) and coordinates of the light receiving point on the photoelectric sensor (x1, y1, 0); and calculating the offset ($\Delta X$, $\Delta Y$, $Dz$) as follows:

$$\Delta X = (X2-X1)+(x2-x1),$$

$$\Delta Y = (Y2-Y1)+(y2-y1),$$

$$Dz = (Z2-Z1).$$

In an aspect of the present invention, it is preferable that: the positioning the adjustment point or the detection point includes determining that the adjustment point or the detection point has been positioned on the photoelectric sensor when a light receiving area of the photoelectric sensor is minimized.

In an aspect of the present invention, a control method of a shape measuring apparatus, the method includes:

storing, in a memory of a computer, the offset calculated by the positioning offset calculation method; and after positioning the adjustment point on a desired measurement start point on a measured object surface, relatively moving, by a computer automatic control, the point sensor and the measured object by the offset.

BRIEF DESCRIPTION OF THE DRAWINGS

FIG. 7 is a diagram illustrating pattern combination examples of laser light beams;

FIG. 12 is a diagram illustrating a modified example.

DETAILED DESCRIPTION

Figure 1:
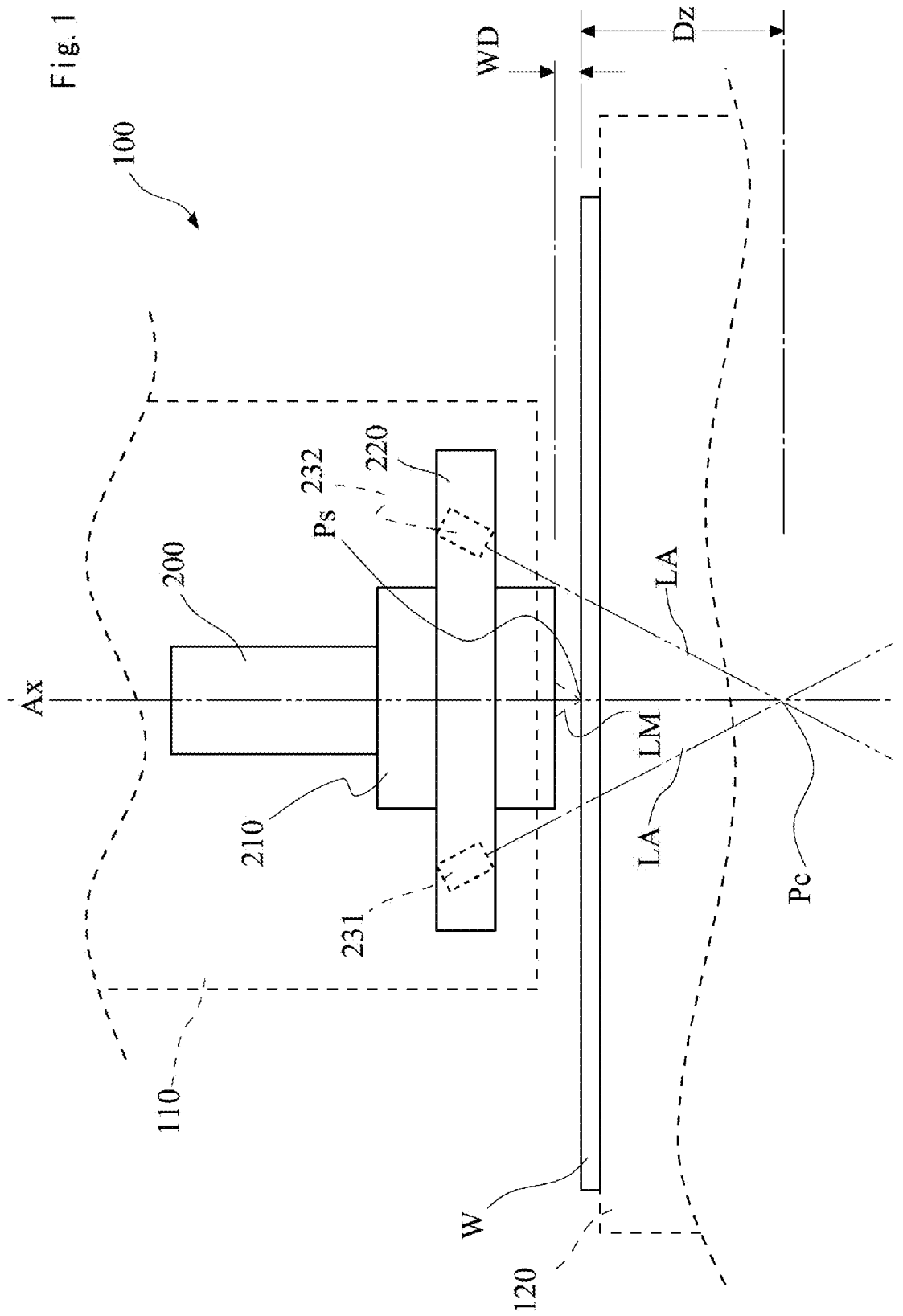
FIG. 1 is a diagram illustrating a shape measuring apparatus according to a first exemplary embodiment.

Exemplary embodiments of the present invention are illustrated and will be described with reference to reference signs assigned to components in the drawings.

First Exemplary Embodiment

FIG. 1 is a diagram illustrating a shape measuring apparatus 100 according to a first exemplary embodiment. In this specification, the shape measuring apparatus 100 equipped with a chromatic point sensor (CPS) 200 as a point sensor will be exemplified. The CPS 200 is disposed at a lower end of a Z-axis spindle 110. The Z-axis spindle 110 is provided on a Z-axis column (not illustrated) so as to be movable in the perpendicular direction (Z direction). Thus, the CPS 200 can be movable in the perpendicular direction (Z direction).

A work W as an object to be measured is placed on a moving stage 120. Although the work W is illustrated as just a flat plate, the work W is actually processed and various kind of patterns or grooves are formed. In order to inspect the processing accuracy, an area to be measured which needs the inspection is determined. The moving stage 120 can be moved in the X direction and the Y direction. Thus, the work W and the CPS 200 are three-dimensionally relatively movable.

A moving mechanism includes the Z-axis column (not illustrated), the Z-axis spindle 110, and the moving stage 120. However, the moving mechanism is only required to three-dimensionally relatively move the CPS 200 and the work W and is not limited to the above configuration. For example, the stage may be fixed and the CPS 200 may be supported so as to be three-dimensionally movable, or vice versa. Furthermore, when the shape measuring apparatus is a roundness measuring apparatus, the moving stage 120 can be replaced with a rotary table.

FIG. 1 illustrates a state where the CPS 200 measures the surface of the work W when viewed from a side. The CPS 200 irradiates the work W with measurement light beam LM so that a spot image of a point light source (not illustrated) is formed on a work surface. In the drawings, the image forming point is indicated by a focus spot Ps. A working distance WD from the CPS 200 to the focus spot Ps is very short, for example, is about 5 to 20 mm.

FIG. 1 illustrates an optical axis Ax of the CPS 200 (objective lens). Since the CPS 200 detects a point of the work surface on the optical axis Ax, it is assumed that the optical axis Ax is a measurement axis. The CPS 200 is a displacement sensor which utilizes axial chromatic aberration, in which a focal distance is different for a wavelength of each light when the light passes through a lens. The distance between the CPS 200 and the work surface is measured by irradiating the work surface with the measurement light beam LM and detecting the wavelength having the strong intensity as a position on a line sensor when the reflected light is diffracted. At this time, the position where the work surface is irradiated with the measurement light beam LM is the focus spot Ps, which is equivalent to a detection point.

In the present exemplary embodiment, the CPS 200 can emit adjusting light beam LA for the positioning in addition to the measurement light beam LM used for the measurement. A flange 220 protruding in the radial direction is provided on a lens barrel 210 of the CPS 200. In the flange 220, two laser light sources 231 and 232 are disposed. The two laser light sources 231 and 232 are disposed on the opposite sides of the optical axis Ax of the CPS 200 (objective lens). The laser light beams from the laser light sources 231 and 232 is the adjusting light beams LA for the positioning. Furthermore, the angle of each of the laser light sources 231 and 232 is adjusted so that the intersection point of the adjusting light beams LA is positioned at a point Pc moved down from the focus spot Ps by a predetermined distance Dz along with the optical axis Ax. The intersection point Pc of the laser light beams (adjusting light beams) LA is referred to as an adjustment point Pc.

When the user lifts the Z-axis spindle 110 (CPS 200) and looks in between the CPS 200 and the work W, it is desirable to secure the predetermined distance Dz so that the user can visually observe the adjustment point Pc without difficulty. Although it depends on the size (diameter size) of the Z-axis spindle 110 or the CPS 200, the predetermined distance Dz may be, for example, about 50 to 100 mm or may be about 200 mm in some cases, while the working distance WD is about 2 to 4 mm. In a ratio, the predetermined distance Dz may be 20 to 25 times the working distance WD or may be 100 times in some cases.

A positioning unit includes the two laser light sources 231 and 232.

Now, the working effect of the positioning unit will be described.

Figure 2:
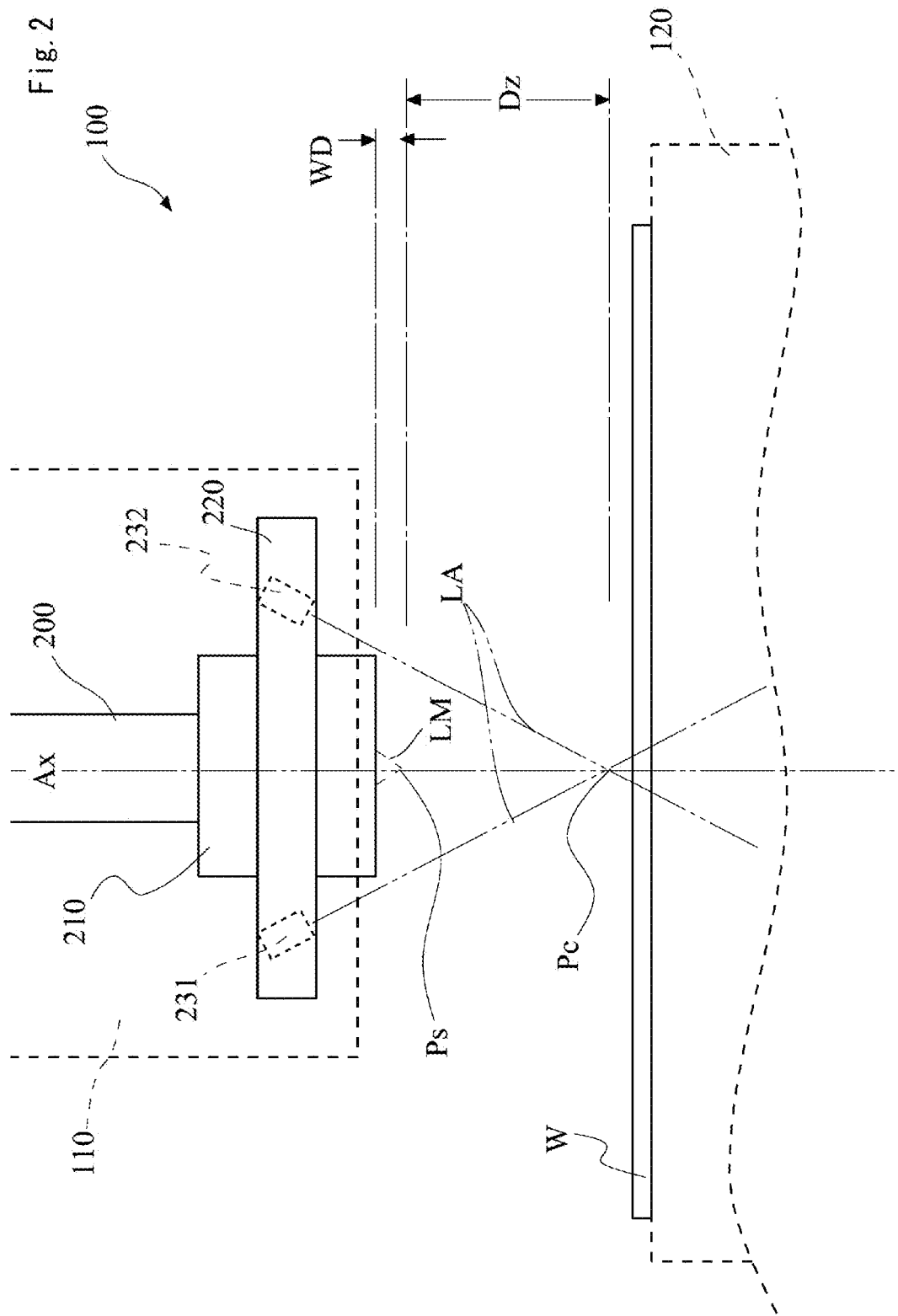
FIG. 2 is a diagram illustrating a state where a CPS is separated from a work.
Figure 3:
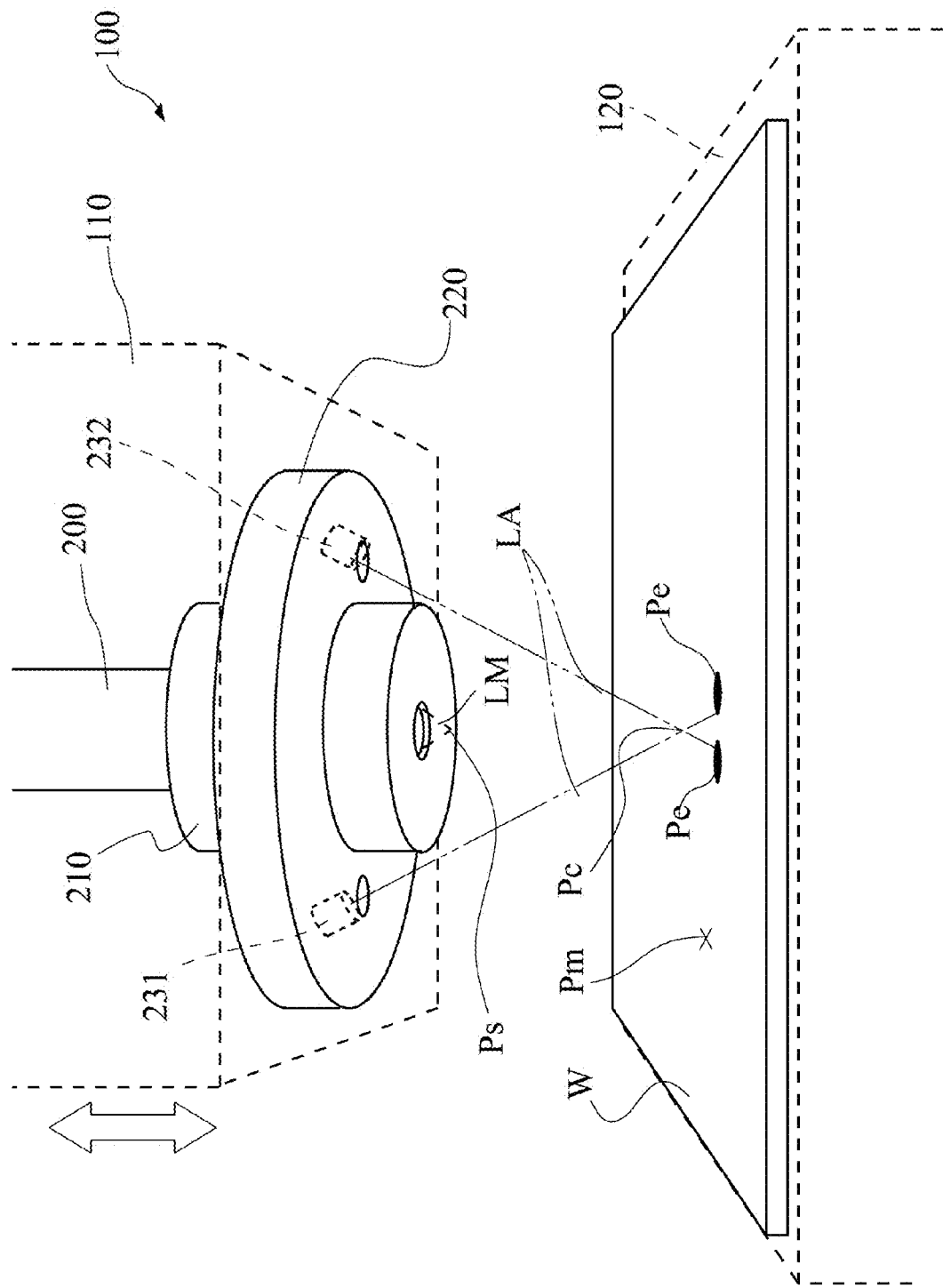
FIG. 3 is a perspective view schematically illustrating the state where the CPS is separated from the work.

It has been described that the user cannot directly see the focus spot Ps in the state where the spot image of the measurement light beam LM is formed on the work W as illustrated in FIG. 1. FIG. 2 illustrates a state where the Z-axis spindle 110 is lifted and the CPS 200 is separated from the work W. FIG. 3 schematically illustrates the state as a perspective view. The adjusting light beams LA from the laser light sources 231 and 232 form the intersection point at the point Pc moved down from the focus spot Ps by the predetermined distance Dz along with the optical axis Ax, but currently, the distance between the CPS 200 and the work W is too large. Therefore, the laser light beams (adjusting light beams) LA pass through the intersection point Pc and separate from each other, and two irradiated points Pe appear on the work W.

Figure 4:
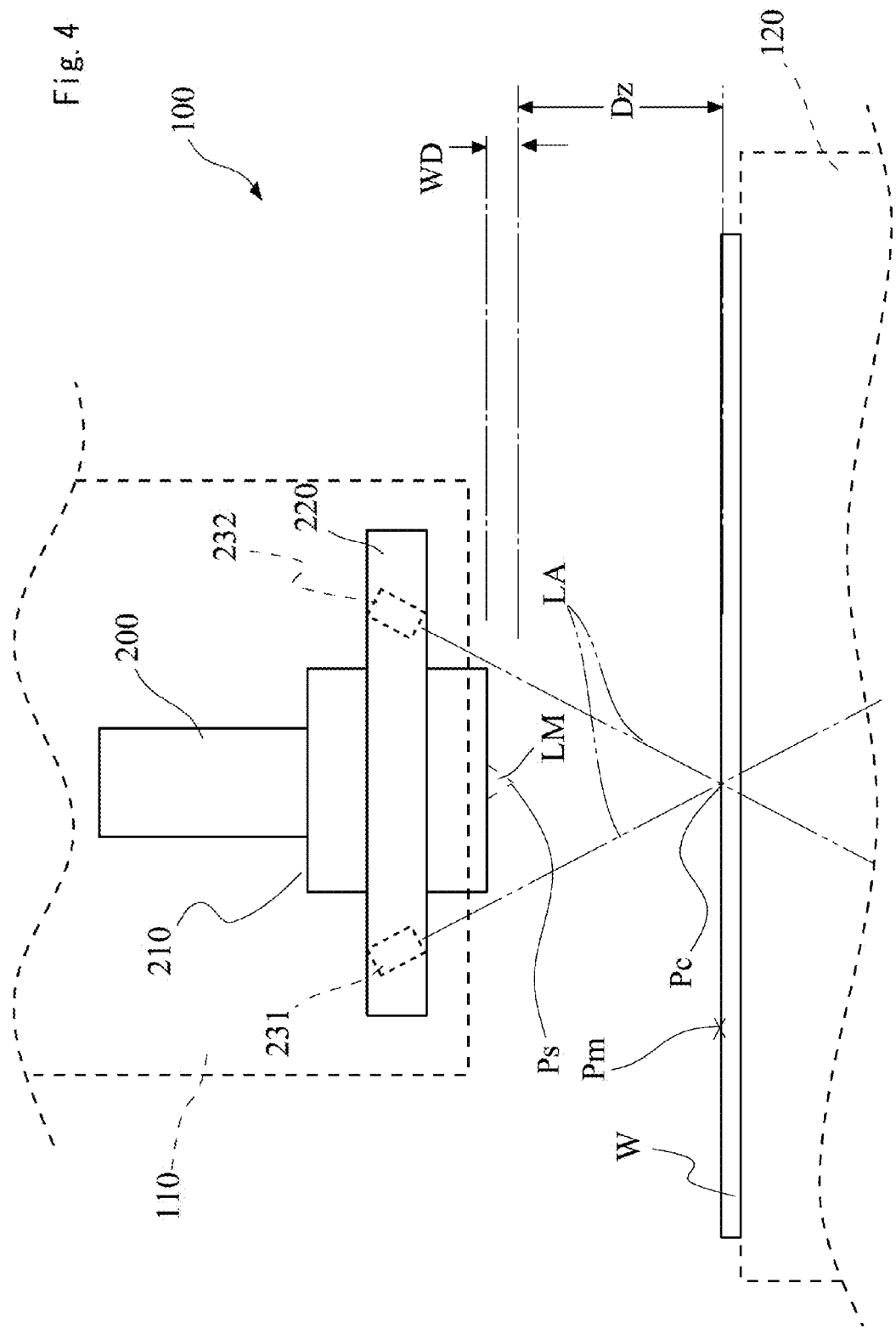
FIG. 4 is a diagram illustrating a state where an adjustment point is adjusted so as to be positioned on the work.
Figure 5:
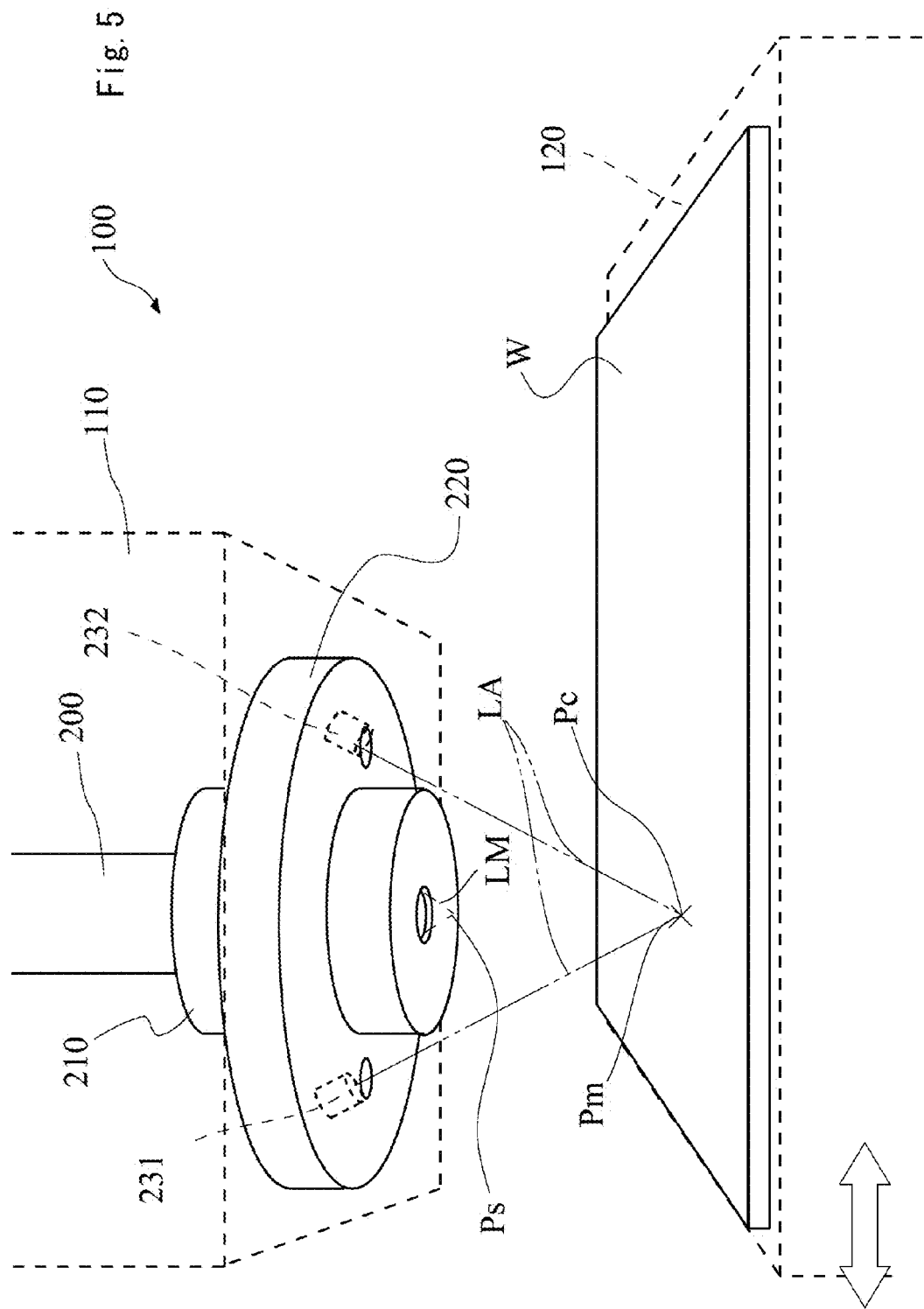
FIG. 5 is a diagram illustrating a state where the adjustment point is positioned so as to be superimposed on a measurement start point.
Figure 6:
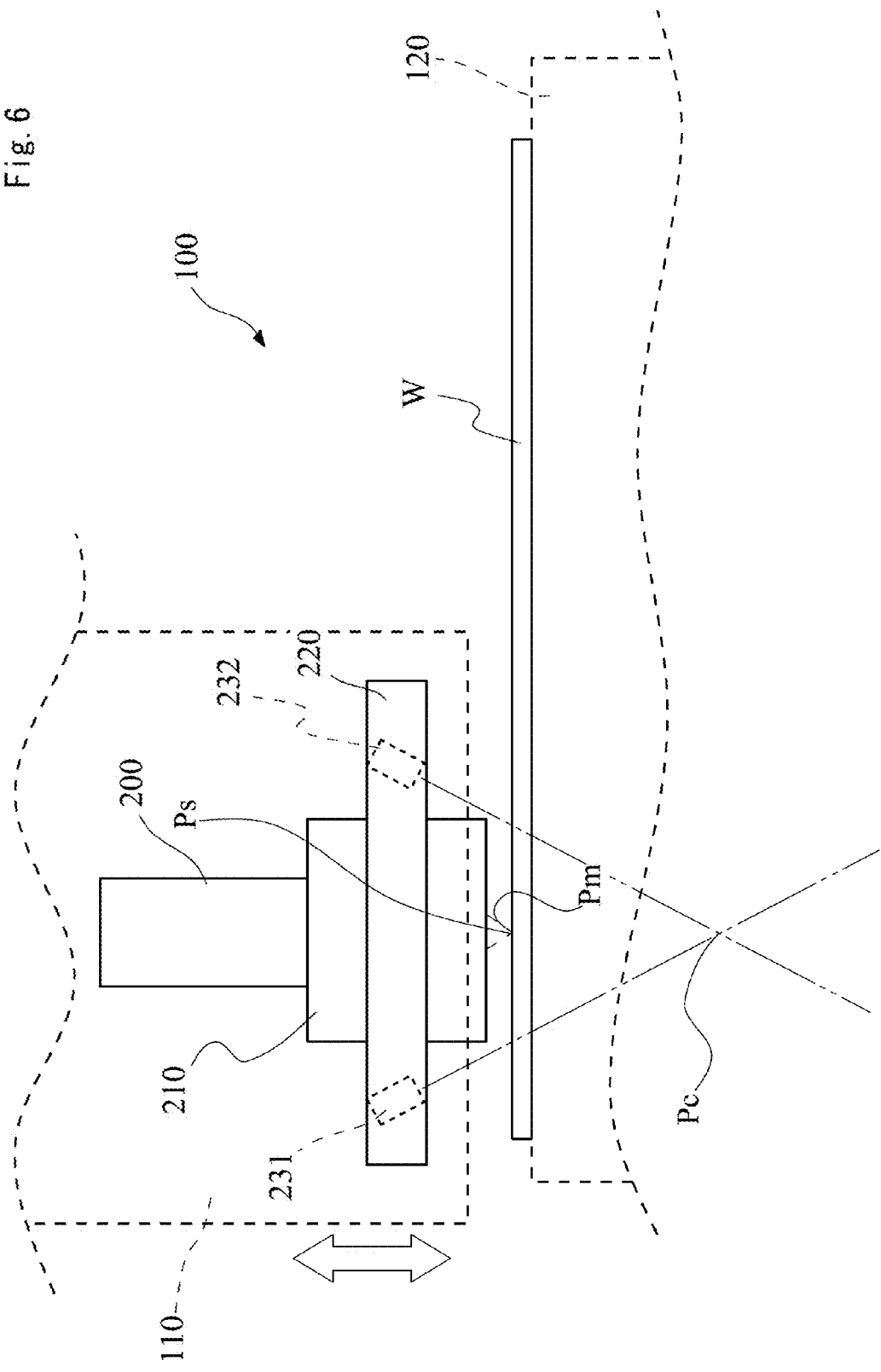
FIG. 6 is a diagram illustrating a state where a focus spot has been positioned on the measurement start point.

The user moves the Z-axis spindle 110 up or down so that the two irradiated point Pe intersect on the work W so as to be a single adjustment point Pc. FIG. 4 illustrates this state. The adjustment point Pc is positioned just under the focus spot Ps along with the optical axis Ax. It is assumed that the desired measurement start point on the work W is a point Pm in FIG. 3. The user moves the moving stage 120 so that the adjustment point Pc is superimposed on the measurement start point Pm. FIG. 5 illustrates this state. Thereafter, the user moves the Z-axis spindle 110 down by the predetermined distance Dz. Then, as illustrated in FIG. 6, the focus spot Ps of the measurement light beam LM is positioned on the desired measurement start point Pm. When the measurement scan is started in this state, the desired range can be measured.

Note that, the number of the laser light sources for the positioning is not limited to two.

As long as the irradiated points Pe intersect at the adjustment point Pc, the number of the laser light sources may be three, four, or more.

According to the first exemplary embodiment, the following effects can be obtained.

(1) Conventionally, it has been difficult to visually observe the measurement light beam LM itself and to accurately position the focus spot Ps of the measurement light beam LM on the measurement start point Pm without an image sensor, such as a charge-coupled device (CCD) camera. In this regard, in the shape measuring apparatus 100 of the present exemplary embodiment, the adjusting light beams LA for the positioning, instead of the measurement light beam LM, are used in order to target the measurement start point Pm. In the state where the work W is separated from the CPS 200 (FIG. 3 and FIG. 4), the user can visually observe the adjustment point Pc on the work W. With an intuitively natural operation in which the adjustment point Pc is to be positioned on the measurement start point Pm, the measurement start point Pm can be targeted.

(2) In the present exemplary embodiment, two or more laser light beams (adjusting light beams) LA intersect at a single point of the adjustment point Pc. Since the adjustment point Pc is fixed to the single point, an offset Dz in the height direction between the focus spot Ps of the measurement light beam LM and the adjustment point Pc is also a fixed value. Therefore, after the adjustment point Pc is positioned on the measurement start point Pm, the CPS 200 is moved down by the predetermined offset Dz, and thereby the focus spot Ps is positioned on the work W. Thus, after the adjustment point Pc is positioned on the measurement start point Pm, the measurement scan can be quickly performed. In contrast, for example, a laser light beam is emitted in parallel to the optical axis Ax of the CPS 200, and the light beam may be used for the positioning. It is possible, as a function of the CPS 200, to automatically detect a point where the focus spot Ps is positioned on the work W after the positioning. However, in this case, it takes too much time to perform the actual measurement after the positioning. In this regard, according to the present exemplary embodiment, it is possible to accurately position the measurement start point without decreasing the measurement efficiency.

(3) The positioning unit of the present exemplary embodiment is to dispose the laser light sources 231 and 232 around the lens barrel 210 of the CPS 200, and the configuration of the shape measuring apparatus 100 as well as the internal structure of the CPS 200 are not changed. Therefore, it is easy to dispose the laser light sources 231 and 232 to the existing the shape measuring apparatus 100 later.

Second Exemplary Embodiment

A second exemplary embodiment of the present invention will be described.

Although a basic configuration of the second exemplary embodiment is the same as the first exemplary embodiment, the second exemplary embodiment has a characteristic in that an intersection point (adjustment point Pc) is to be easily recognized by coloring or patterning a laser light beam for the positioning. An irradiated points Pe of laser light beams (adjusting light beams) LA are circles or ellipses having a certain size. Although the height of a CPS 200 needs to be adjusted so as to superimpose the two irradiated points Pe, it is the user to judge whether the two irradiated points Pe are superimposed by visual observation. Therefore, individual differences occur in the judgement. (If the laser light beam is an ellipse, it is difficult to recognize whether the beams are perfectly superimposed or slightly shifted even before or after being superimposed.) When the beams are not perfectly superimposed (the accuracy is lacking), it is recognized that a point shifted from an optical axis Ax is just under a focus spot Ps. In this case, the focus spot Ps is shifted from a desired measurement start point Pm.

Therefore, modified examples to easily recognize the intersection point (adjustment point Pc) are as follows:

Modified Example 1

One laser light beam LA is made red, and the other laser light beam LA is made blue. Then, the user will see purple at the intersection point (adjustment point Pc). In this manner, the colors of the adjusting light beams LA are different from each other, it is easy to recognize the intersection point (adjustment point Pc).

Modified Example 2

The laser light beams LA for the positioning are patterned to be easily recognized. In order to pattern the laser light beam LA, a plate having slits corresponding to the pattern may be used. Alternatively, laser light sources 231 and 232 themselves or a micro mirror may minutely drive to draw the pattern. The examples of patterns are shown in FIG. 7. Naturally, the pattern and the color may be combined.

Note that, the right laser light beam LA and the left laser light beam LA are distinguishable by being colored or patterned, and which makes secondary effect in operability. When the two irradiated points Pe are not superimposed and appear on the work W, the CPS 200 needs to be moved up or down so as to superimpose the two irradiated points Pe. However, whether the CPS 200 is to be moved up or down cannot be immediately judged. Naturally, if trying to move the CPS 200 up or down for the time being, the user finds the correct direction to move. However, it is troublesome to rely on trial and error. Although the case in which a Z-axis spindle 110 has a manual handle does not take so much trouble, the case in which the user is required to input a command to move the CPS 200 up or down takes much trouble and the psychological barrier is strong. In this regard, when the irradiated point Pe by the right laser light beam LA and the irradiated point Pe by the left laser light beam LA can be distinguished, whether the CPS 200 is to be moved up or down is immediately judged.

Third Exemplary Embodiment

A third exemplary embodiment of the present invention will be described.

Although a basic configuration of the third exemplary embodiment is the same as the first and second exemplary embodiments, the third exemplary embodiment has a characteristic in that an offset amount between a focus spot Ps and an adjustment point Pc has been accurately calculated.

As described above, laser light sources 231 and 232 are disposed so that the adjustment point Pc is positioned at a point moved down from the focus spot Ps by a predetermined distance Dz along with an optical axis Ax. However, there are assembly errors between a design and an actual machine, and theoretical calculation cannot be perfectly performed. Therefore, the offset amount between the focus spot Ps and the adjustment point Pc is calculated in advance, and it is preferable that the offset amount is automatically compensated when a work W is measured.

(Calculating Offset Dz in Height Direction)

Figure 8:
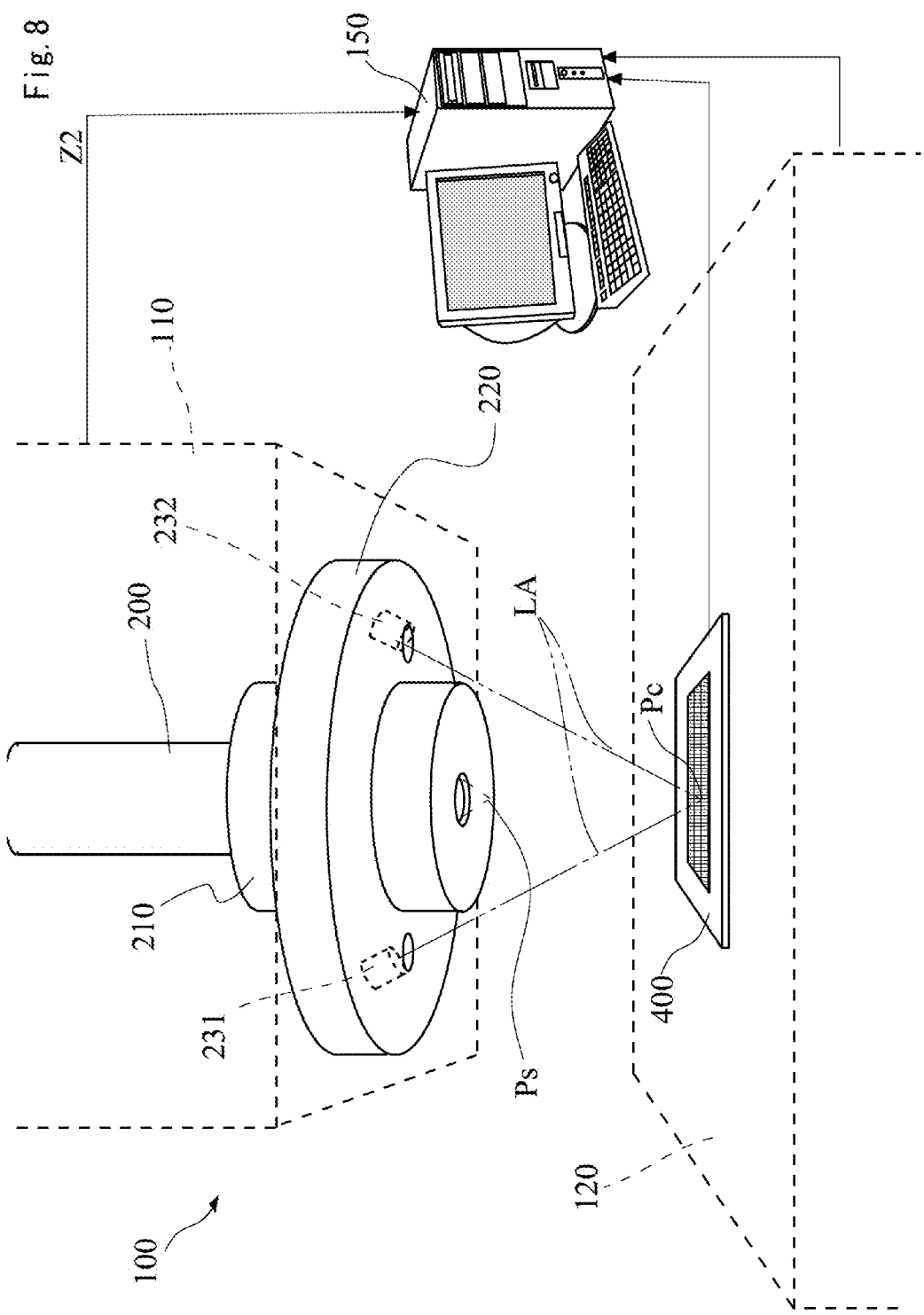
FIG. 8 is a diagram illustrating a state calculating an offset in the height direction.

As illustrated in FIG. 8, a photoelectric sensor 400, such as a CCD or a complementary metal oxide semiconductor (CMOS), as a work for calibration is prepared.

First, the height of a CPS 200 is adjusted so that an intersection point (adjustment point Pc) of laser light beams (adjusting light beams) LA for the positioning is positioned on the photoelectric sensor 400. Here, a program is installed in a computer 150 to detect the height of a Z-axis spindle 110 when a light receiving area by the photoelectric sensor 400 is minimized. In this manner, the height Z2 of the Z-axis spindle 110 at the time when the adjustment point Pc is positioned on the photoelectric sensor 400 is calculated.

Figure 9:
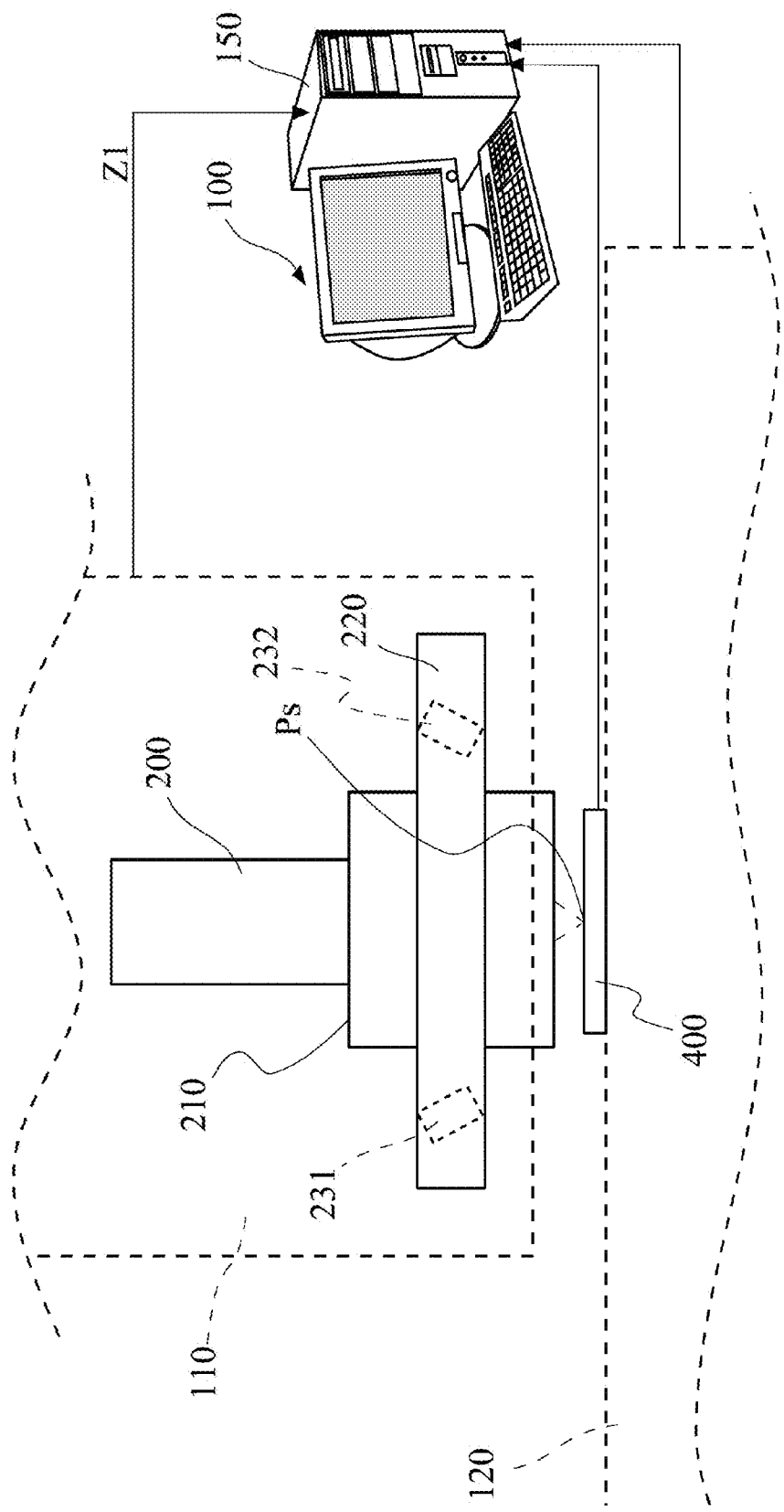
FIG. 9 is a diagram illustrating a state calculating the offset in the height direction.

As a next step, the height Z1 of the Z-axis spindle 110 at the time when the focus spot Ps is positioned on the photoelectric sensor 400 is to be calculated. Similarly to the above, it is detected that the height Z1 of the Z-axis spindle 110 at the time when the light receiving area by the photoelectric sensor 400 is minimized (see FIG. 9).

The offset Dz in the height direction is (Z2−Z1). The height offset Dz is stored in the computer 150. Then, after positioning the adjustment point Pc on the measurement start point Pm, a program is installed to start the measurement operation after the Z-axis spindle 110 is automatically moved down by the height offset Dz.

(Calculating Lateral Direction Offset Dt)

Figure 10:
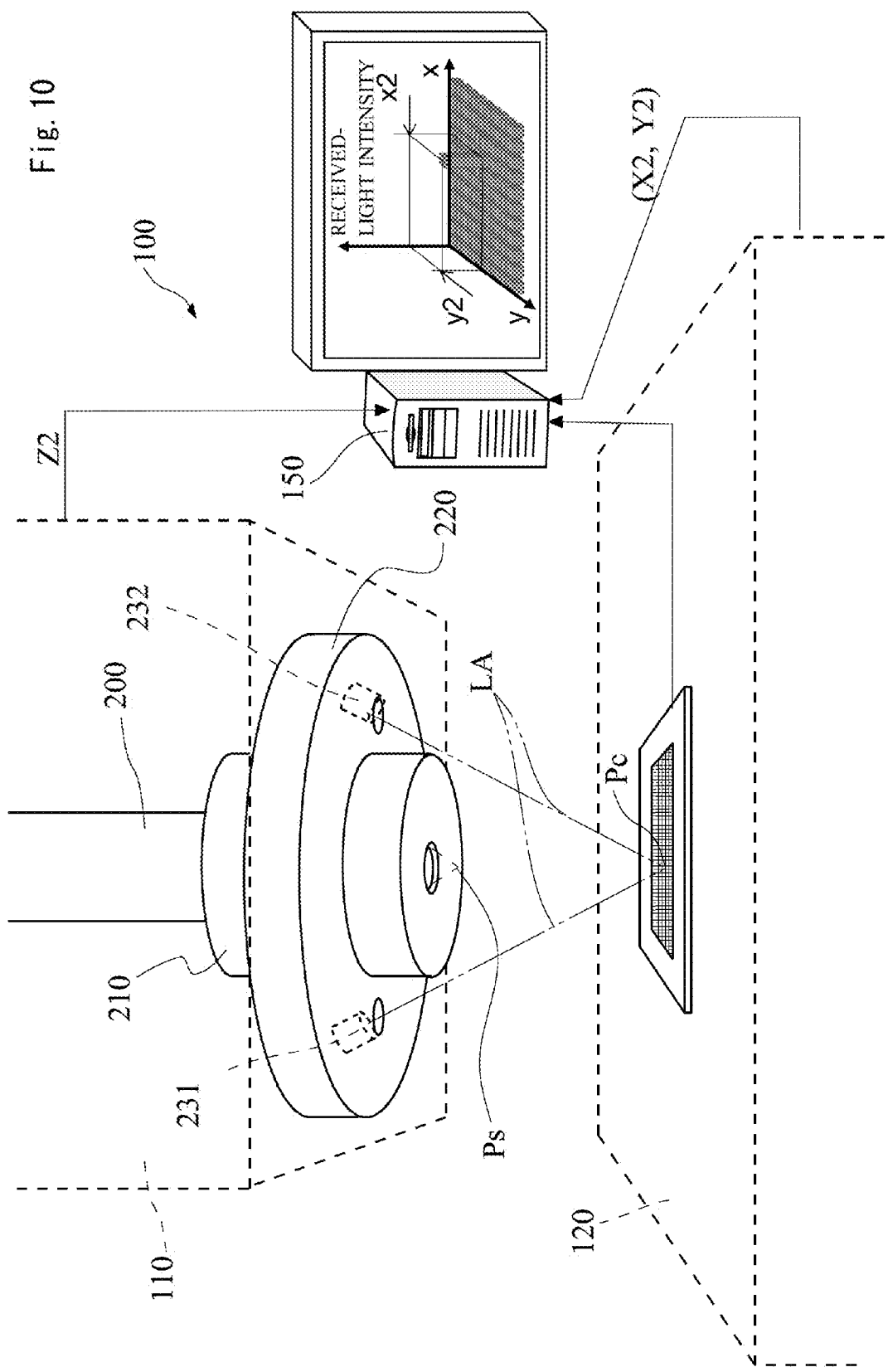
FIG. 10 is a diagram illustrating a state calculating an offset in the lateral direction.

There is an offset in the lateral direction as well as the offset in the height direction, and the photoelectric sensor 400 is similarly used to calculate the offset in the lateral direction. As illustrated in FIG. 10, the height of the CPS 200 is adjusted so that the intersection point (adjustment point Pc) of the laser light beams (adjusting light beams) LA for the positioning is positioned on the photoelectric sensor 400. At this time, it is detected that elements in which range of the photoelectric sensor 400 receive how strong the intensity of light, and the height position of the CPS 200 is finely adjusted so as to minimize the light receiving range. Then, it is assumed that the point where the received-light intensity is maximized is the coordinates of the adjustment point Pc. Here, it is assumed that the coordinates of the moving stage 120 is (X2, Y2), and the coordinates of the adjustment point Pc on the photoelectric sensor 400 is (x2, y2).

Figure 11:
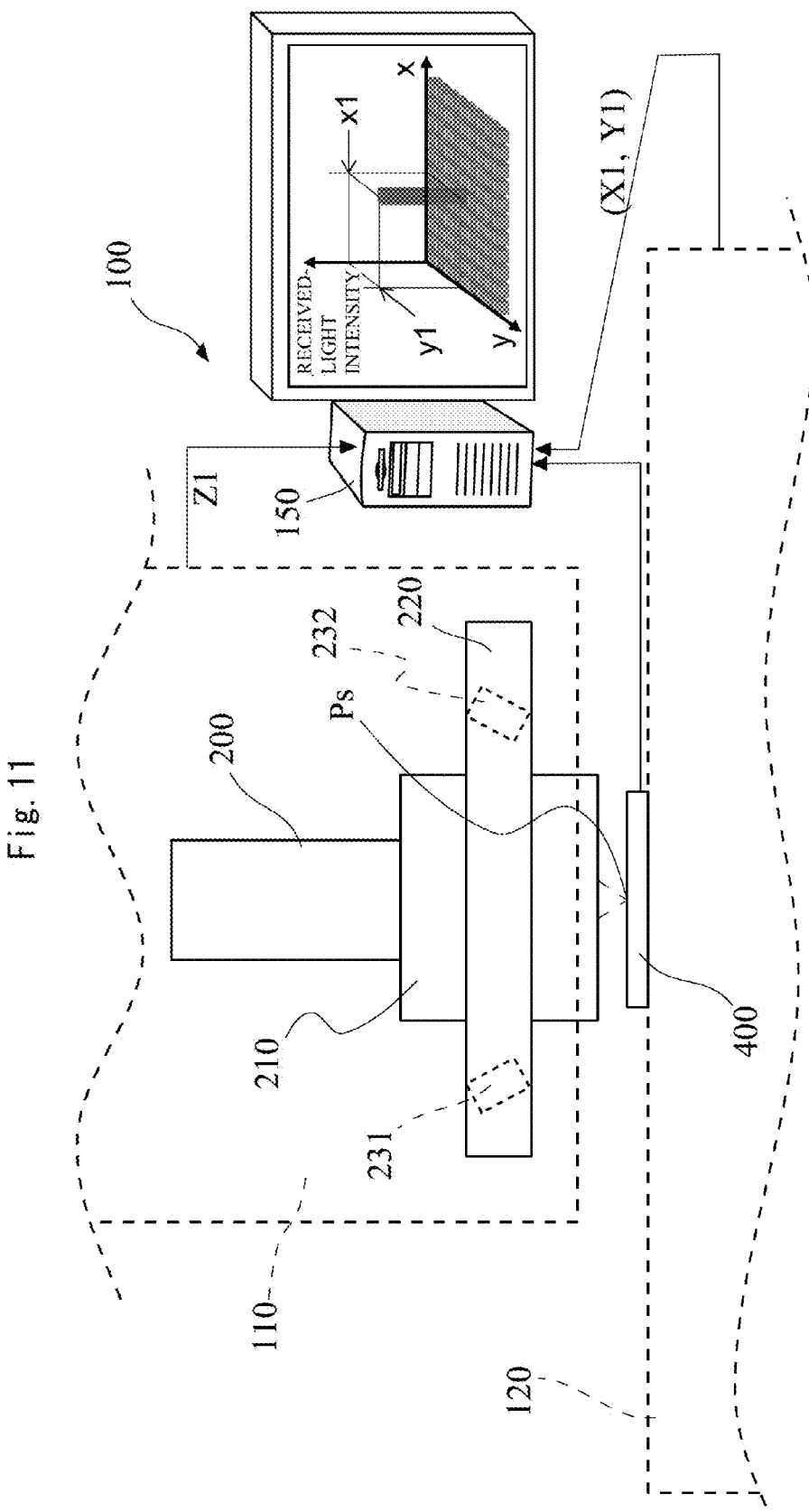
FIG. 11 is a diagram illustrating a state calculating the offset in the lateral direction.

Similarly, as illustrated in FIG. 11, the height of the CPS 200 is adjusted so that the focus spot Ps is positioned on the photoelectric sensor 400. In other words, detected is which range of the photoelectric sensor 400 receives how strong the intensity of light, and the height position of the CPS 200 is finely adjusted so as to minimize the light receiving range. Then, the point where the received-light intensity is maximized is assumed to be the coordinates of the focus spot Ps. Here, it is assumed that the coordinates of the moving stage 120 is (X1, Y1), and the coordinates of the adjustment point Pc on the photoelectric sensor 400 is (x1, y1). (Note that, since it is not necessary to move the moving stage 120, it may be considered that (X2, Y2) equals (X1, Y1).)

The lateral direction offset Dt is represented by (ΔX, ΔY) and calculated as follows:

$$\Delta X=(X2-X1)+(x2-x1),$$

$$\Delta Y=(Y2-Y1)+(y2-y1).$$

The lateral direction offset Dt is stored in the computer 150.

In the computer 150, installed is a program which automatically compensates the lateral direction offset Dt after positioning the adjustment point Pc on the measurement start point Pm.

Note that, the present invention is not limited to the above exemplary embodiments and can be appropriately modified without departing from the scope.

Although the CPS has been exemplified as the point sensor, for example, a contact type stylus may be used. Since a stylus 320 is protected with a skid 310, which part of the work W that the tip is in contact with cannot be directly seen. Therefore, as illustrated in FIG. 12, the laser light sources 231 and 232 for the positioning may be disposed around the skid 310 so as to position the measurement start point Pm using the adjustment point Pc. Note that, in this case, it may be interpreted that the distance between the lower end of the skid 310 and the tip of the stylus is equivalent to the working distance. In the case of FIG. 12, the stylus 320 moves up and down in the Z direction according to the roughness of the work surface, and the shape of the work surface can be detected with the up-and-down movement of the stylus. Therefore, the movable direction (the perpendicular direction and the Z direction) of the stylus is equivalent to the measurement axis. Furthermore, since the work is detected with the tip of the stylus, the tip of the stylus is equivalent to the detection point.

Note that, it is useful to provide the positioning unit on a skidless (having no skid) stylus. When it is difficult to secure the space to dispose the positioning unit (the laser light sources 231 and 232), the design may be appropriately changed. As long as the lateral direction offset Dt is compensated, the adjustment point Pc and the focus spot Ps are not required to be on the same axis. Instead, the adjustment point Pc can be positively shifted from the measurement axis of the stylus.

In the above third exemplary embodiment, the photoelectric sensor 400 has been exemplified to calculate the offset, but the CCD is unnecessary if the offset in the height direction is only calculated. The offset in the height direction can be calculated using just a flat plate. However, since it is effective to use the photoelectric sensor in order to calculate the offset in the lateral direction, the offset Dz in the height direction may be calculated at the same time of calculating the lateral direction offset Dt. That is, when (X2, Y2) is calculated, Z2 is simultaneously detected. Similarly, when (X1, Y1) is calculated, Z1 is simultaneously detected. In this manner, the lateral direction offset Dt and the height direction offset Dz can be simultaneously calculated. In other words, the coordinates of the moving mechanism (X2, Y2, Z2) and the coordinates of the light receiving point on the photoelectric sensor (x2, y2, 0) are obtained when the adjustment point Pc is positioned on the photoelectric sensor, and the coordinates of the moving mechanism (X1, Y1, Z1) and the coordinates of the light receiving point on the photoelectric sensor (x1, y1, 0) are obtained when the detection point Pm is positioned on the photoelectric sensor. Thus, the offset ($\Delta X$, $\Delta Y$, Dz) is calculated as follows:

$$\Delta X=(X2-X1)+(x2-x1),$$

$$\Delta Y=(Y2-Y1)+(y2-y1),$$

$$Dz=(Z2-Z1).$$

In the above exemplary embodiments, it has been described that the adjustment point Pc and the focus spot Ps are on the same the optical axis Ax. If the adjustment point Pc is positioned just under the focus spot Ps along with the optical axis Ax, there is an advantage that the user can intuitively easily recognize the point. However, as long as the lateral direction offset Dt is compensated, the adjustment point Pc and the focus spot Ps are not required to be on the same axis. Instead, the adjustment point Pc can be positively shifted from the axis (the optical axis Ax). When it is difficult to secure the space to dispose the positioning unit (the laser light sources 231 and 232), the user may appropriately judge the situation.

In order to dispose the laser light sources 231 and 232 for the positioning, the flange is provided on the CPS 200 (point sensor), and the laser light source is buried in the flange. The position to dispose the laser light sources is not limited to this, and the laser light source may be disposed, for example, at a lower end of the Z-axis spindle 110.

What is claimed is:

1. A shape measuring apparatus comprising:
a point sensor configured to approach an object surface to be measured and detect the object;
a moving mechanism configured to three-dimensionally relatively move the object and the point sensor; and
a positioning unit configured to position a detection point of the point sensor on a desired measurement start point, wherein
the positioning unit includes two or more laser light sources,
laser light beams from the two or more laser light sources intersect at an adjustment point separated from the detection point, which is away from the point sensor, by a predetermined distance,
a flange protruding in a direction orthogonal to a measurement axis is attached along the point sensor, and
the two or more laser light sources are disposed in the flange.

2. The shape measuring apparatus according to claim 1, wherein the adjustment point is separated from the detection point by a predetermined distance Dz along with a measurement axis of the point sensor.

3. The shape measuring apparatus according to claim 2, wherein the predetermined distance Dz is 20 to 100 times a working distance of the point sensor.

4. The shape measuring apparatus according to claim 1, wherein the shape measuring apparatus has no image sensor for measuring an image.

5. The shape measuring apparatus according to claim 1, wherein the point sensor is a chromatic point sensor.

6. The shape measuring apparatus according to claim 1, wherein the laser light beams from the two or more laser light sources have a different color or a different pattern from each other.

7. A positioning offset calculation method of a shape measuring apparatus, the shape measuring apparatus comprising:
a point sensor configured to approach an object surface to be measured and detect the object;
a moving mechanism configured to three-dimensionally relatively move the object and the point sensor; and
a positioning unit configured to position a detection point of the point sensor on a desired measurement start point, wherein the positioning unit includes two or more laser light sources, and laser light beams from the two or more laser light sources intersect at an adjustment point separated from the detection point, which is away from the point sensor, by a predetermined distance, the method comprising:

preparing a photoelectric sensor as a work to calculate an offset;

positioning the adjustment point on the photoelectric sensor;

obtaining coordinates of the moving mechanism (X2, Y2, Z2) and coordinates of a light receiving point on the photoelectric sensor (x2, y2, 0) at this time;

positioning the detection point on the photoelectric sensor;

obtaining coordinates of the moving mechanism (X1, Y1, Z1) and coordinates of the light receiving point on the photoelectric sensor (x1, y1, 0); and calculating the offset ($\Delta X$, $\Delta Y$, $\Delta z$) as follows:

$\Delta X = (X2-X1)+(x2-x1)$, $\Delta Y = (Y2-Y1)+(y2-y1)$, $Dz = (Z2-Z1)$.

8. The positioning offset calculation method according to claim 7, wherein the positioning the adjustment point or the detection point includes determining that the adjustment point or the detection point has been positioned on the photoelectric sensor when a light receiving area of the photoelectric sensor is minimized.

* * * * *